United States Patent
Ganss et al.

(10) Patent No.: US 10,905,525 B2
(45) Date of Patent: Feb. 2, 2021

(54) MEDICAL DEVICE FOR REMOVING TOOTH FRAGMENTS

(71) Applicant: Rainer Ganss, Celle (DE)

(72) Inventors: Rainer Ganss, Celle (DE); Dania Ulfat, Hamburg (DE)

(73) Assignee: Rainer Ganss, Celle (DE)

( * ) Notice: Subject to any disclaimer, the term of this patent is extended or adjusted under 35 U.S.C. 154(b) by 0 days.

(21) Appl. No.: 16/095,783

(22) PCT Filed: May 17, 2017

(86) PCT No.: PCT/DE2017/100423
§ 371 (c)(1),
(2) Date: Oct. 23, 2018

(87) PCT Pub. No.: WO2017/206984
PCT Pub. Date: Dec. 7, 2017

(65) Prior Publication Data
US 2019/0125488 A1    May 2, 2019

(30) Foreign Application Priority Data

Jun. 3, 2016 (EP) .................................. 16172861
Oct. 18, 2016 (DE) ...................... 10 2016 119 790
Mar. 28, 2017 (DE) ...................... 10 2017 106 576

(51) Int. Cl.
- *A61C 5/46* (2017.01)
- *A61C 5/42* (2017.01)
- *A61C 3/02* (2006.01)

(52) U.S. Cl.
CPC .................. *A61C 5/46* (2017.02); *A61C 3/02* (2013.01); *A61C 5/42* (2017.02)

(58) Field of Classification Search
CPC .... A61C 5/42; A61C 5/46; A61C 3/02; A61C 3/14; A61C 3/16; A61C 8/0089; A61C 5/48
(Continued)

(56) References Cited

U.S. PATENT DOCUMENTS

| | | | | |
|---|---|---|---|---|
| 717,594 A | * | 1/1903 | Miles, Jr. | A61C 5/42 433/102 |
| 4,365,958 A | * | 12/1982 | Vlock | A61C 3/02 433/225 |

(Continued)

FOREIGN PATENT DOCUMENTS

| | | | |
|---|---|---|---|
| DE | 197 08 870 A1 | 9/1998 | |
| DE | 19708870 A1 | * 9/1998 | ............... A61C 5/40 |

(Continued)

OTHER PUBLICATIONS

Translation of DE-19708870-A1 (Year: 1998).*
(Continued)

*Primary Examiner* — Edward Moran
*Assistant Examiner* — Matthew P Saunders
(74) *Attorney, Agent, or Firm* — Collard & Roe, P.C.

(57) ABSTRACT

A medical tool and a method for using the medical tool removes tooth fragments, in particular tooth roots and/or remainders of tooth roots, from a tooth socket or an alveole in the region of the jaw. The medical tool includes a base and a needle disposed on the base. The needle has a retentive section and a drilling section.

14 Claims, 10 Drawing Sheets

(58) Field of Classification Search
USPC .......................................... 433/102, 144, 165
See application file for complete search history.

(56) References Cited

U.S. PATENT DOCUMENTS

| | | | | |
|---|---|---|---|---|
| 4,824,370 | A * | 4/1989 | Laurichesse | A61C 5/42 433/102 |
| 5,439,338 | A * | 8/1995 | Rosenberg | B25B 13/5091 411/400 |
| 5,735,689 | A | 4/1998 | McSpadden | |
| 5,951,288 | A * | 9/1999 | Sawa | A61C 8/0033 433/173 |
| 6,019,602 | A * | 2/2000 | Fletcher | A61C 3/14 433/130 |
| 6,293,794 | B1 * | 9/2001 | McSpadden | A61C 5/42 433/102 |
| 7,955,078 | B2 * | 6/2011 | Scianamblo | A61C 5/42 433/102 |
| 2003/0013067 | A1 * | 1/2003 | Bleiweiss | A61C 5/42 433/102 |
| 2006/0265858 | A1 * | 11/2006 | McSpadden | A61C 5/42 29/558 |
| 2007/0218423 | A1 * | 9/2007 | Sapian | A61C 1/145 433/152 |
| 2008/0090206 | A1 * | 4/2008 | Hoke | A61C 3/12 433/152 |
| 2010/0266983 | A1 * | 10/2010 | Ng | A61C 3/14 433/114 |
| 2015/0037755 | A1 * | 2/2015 | Luzzader | A61C 3/02 433/165 |
| 2015/0366635 | A1 * | 12/2015 | Shotton | A61C 5/42 433/102 |
| 2017/0281311 | A1 * | 10/2017 | Aloise | A61B 17/1617 |

FOREIGN PATENT DOCUMENTS

| | | | |
|---|---|---|---|
| DE | 199 31 734 A1 | 1/2001 | |
| DE | 20 2005 007 267 U1 | 12/2005 | |
| DE | 20 2005 020 213 U1 | 3/2006 | |
| DE | 20 2006 001 276 U1 | 3/2006 | |
| DE | 596 36 020 T2 | 8/2006 | |
| WO | 97/21392 A1 | 6/1997 | |
| WO | WO-2012175724 A2 * | 12/2012 | A61C 5/42 |

OTHER PUBLICATIONS

Translation of WO-2012175724-A2 (Year: 2012).*
International Search Report of PCT/DE2017/100423, dated Aug. 10, 2017.

* cited by examiner

MEDICAL DEVICE FOR REMOVING TOOTH FRAGMENTS

CROSS REFERENCE TO RELATED APPLICATIONS

This application is the National Stage of PCT/DE2017/100423 filed on May 17, 2017, which claims priority under 35 U.S.C. § 119 of European Application No. 16172861.3 filed on Jun. 3, 2016, German Application No. 10 2016 119 790.4 filed on Oct. 18, 2016, and German Application No. 10 2017 106 576.8 filed on Mar. 28, 2017, the disclosures of which are incorporated by reference. The international application under PCT article 21(2) was not published in English.

The invention relates to a medical tool for removal of tooth fragments, in particular tooth roots and/or tooth root remnants, from a tooth socket or an alveolus in the jaw region.

In tooth extraction, it can happen, particularly if a tooth that has already been severely damaged is supposed to be pulled, that the tooth to be pulled breaks off and/or apart, and tooth fragments, in particular tooth roots or tooth root remnants, remain in the tooth socket or alveolus. In order to remove this tooth fragment from the alveolus, nowadays a comparatively complicated, multi-step operation using special instruments still has to be carried out. Depending on the size and the stability of the tooth fragment remaining in the alveolus, as well as the depth and the configuration of the alveolus, such a surgical operation can prove to be quite complicated.

In such an extraction of a tooth fragment, in particular of a tooth root or a tooth root remnant, the state of the art provides for cleaning and enlarging the root canal by means of a root file or a root drill, and subsequently of introducing a further tool into the cleaned and enlarged root canal, which tool produces a shape-fit connection between the tool and the tooth root.

A plurality of different embodiments of a root file or a root drill is shown in DE 696 36 020 T2, which tools can be used for cleaning and enlarging the root canal.

Furthermore, DE 199 31 734 A1 describes a tool for removal of tooth roots, in which a highly elastic, rigid needle is introduced into a cleaned and enlarged root canal to guide an extractor, and subsequently the extractor, which is configured in the manner of a thread drill, is screwed into the tooth root by rotation of the extractor. By means of bringing the extractor into the tooth root, a shape-fit connection between the tooth root and the extractor is formed, and thereby removal of the extractor from the alveolus is equivalent to pulling the tooth root remnant.

DE 197 08 870 C2 describes a tool for removal of tooth roots, in which a retentive element, wherein the retentive element is configured as a barb or in the manner of a thread drill, is introduced into the cleaned and enlarged root canal, or a bore introduced into the tooth root. Because of the retentive element, a force-fit connection between the tool and the tooth root is produced. Removal of the tool therefore leads to removal of the tooth root from the alveolus.

It is a disadvantage of the state of the art mentioned above that the tooth root first has to be cleaned and enlarged, or that a separate bore must be introduced into the tooth root remnant. Depending on the size of the tooth root remnant remaining in the alveolus, this already means a complicated surgical operation, during which the alveolus might also have to be cut open and/or enlarged, under some circumstances. Subsequently, at least a second tool has to be introduced into the cleaned and enlarged root canal or into the bore introduced specifically for that purpose, which tool enters into a force-fit connection with the tooth root remnant, so as to subsequently remove the tooth root remnant.

Nerve needles, which are furthermore known from the state of the art, are only suitable for removing nerve remnants from tooth root remnants, but not for removing the entire tooth fragment, in particular the tooth root or the tooth root remnant as such.

Such methods according to the state of the art are comparatively time-consuming and therefore costly. Furthermore, the patient is exposed to pain over a comparatively long period of time due to the complicated operation. Furthermore, the complaints after the surgical operation has taken place, as well as the wound healing progression and the risk of wound infections and subsequent bleeding are significantly dependent on the invasiveness of the surgical operation, and for this reason, a minimally invasive surgical operation is preferred.

The present invention is therefore based on the task of eliminating the problems in the removal of tooth fragments, in particular tooth roots and/or tooth root remnants, from a tooth socket or an alveolus in the jaw region, and, in particular, of making available a medical tool that allows faster and more cost-advantageous extraction of tooth fragments, in particular tooth roots and/or tooth root remnants, and requires only a minimally invasive operation.

This task is accomplished, in the case of a medical tool, by means of the characteristics described herein. Further developments and advantageous embodiments are also described herein.

The medical tool according to the invention, for removal of tooth fragments, in particular tooth roots and/or tooth root remnants, from a tooth socket or an alveolus in the jaw region, comprises a base and a needle disposed on the base, wherein the needle has a retentive section and a drilling section.

On the basis of the tool according to the invention, it is possible for the first time to remove a tooth fragment, in particular a tooth root and/or a tooth root remnant, from a tooth socket or an alveolus, without the root canal having to be cleaned or enlarged in a previous operative step, or a bore having to be introduced into the tooth fragment. On the basis of the drilling section of the tool according to the invention, it is possible to clean and/or to enlarge the tooth root canal or to introduce a bore into the tooth fragment.

As soon as the drilling section has penetrated deeply enough into the tooth root canal or the tooth fragment, the retentive section of the tool according to the invention is automatically guided into the tooth root canal or into the bore in the tooth fragment after it. On the basis of the retentive section having been brought into the tooth root canal or into the bore in the tooth fragment, a shape-fit and/or force-fit connection between the tool according to the invention, in particular the retentive section, and the tooth fragment is produced by the retentive elements. Consequently, removal of the tool according to the invention has the result that the tooth fragment to be removed is also removed from the alveolus.

Therefore it is possible, in contrast to the state of the art, to remove the tooth fragment that has remained in the alveolus, in particular the tooth root or the tooth root fragment, by means of only a single tool and only a single operative step.

A drive in the form of a mechanical or a manual or hand-operated drive can be disposed on the base. Mechanical drives can be driven electrically or pneumatically, in particular.

For the predominant number of applications, it can be advantageous if the base and the needle and/or the needle as such are configured in one piece. Such a single-part medical tool or single-part needle can be removed from packaging in sterile manner, in particularly simple manner, and used directly.

However, it can also be advantageous if the base and the needle are configured in multiple parts and can be connected with one another.

The multi-part configuration of base and needle has the advantage that the base can be re-used after thorough cleaning. The needle, in contrast, is preferably structured as a disposable, single-use part.

It can also be advantageous if the needle is configured in multiple parts and, in particular, if the retentive section and the drilling section each form an individual element, wherein the individual elements of the needle can be connected with one another.

Depending on the purpose of use, different retentive sections and/or drilling sections can be combined to form a needle according to the invention. In this regard, the drilling sections and/or retentive sections can have different lengths and/or diameters, depending on the field of use. Furthermore, the drilling section can have different cross-sections as well as drilling profiles, depending on the purpose of use. A selection of drilling profiles that can be used can be found in DE 696 36 020 T2.

The retentive section can also be structured differently, depending on the purpose of use; for example, the number and/or the length of the retentive elements disposed on the retentive section, in particular, can be structured differently. Furthermore, a multi-part structure of the needle makes it possible to produce the existing sections of the needle, in particular the retentive section and the drilling section, from different materials.

It can be advantageous if the retentive section and the drilling section are configured in one piece.

The one-part configuration of the retentive section and the drilling section makes it possible to produce the sections in a single production method, and this can lead to cost savings.

It can be advantageous if the drilling section is disposed on the end of the needle that lies opposite the base.

The root canal is supposed to be cleaned and/or enlarged by means of the drilling section, or a bore is supposed to be introduced into a tooth fragment, in particular the tooth root or the tooth root remnant. In order to guarantee this, it is advantageous to dispose the drilling section at the tip of the tool according to the invention, in the direction of insertion of the tool according to the invention, and thereby at the end of the needle that lies opposite the base.

It can be advantageous if the drilling section has a narrowing tip.

A narrowing tip at one end, in particular the end of the drilling section, which is supposed to be introduced first into the tooth fragment, in particular the tooth root or the tooth root remnant, makes it possible to guide the tool according to the invention more precisely and reliably, and to simplify initial contact of the tool on or in the tooth fragment, in particular the tooth root or the tooth root remnant.

It can be advantageous if the retentive section is disposed between the base and the drilling section.

The retentive section serves for producing a shape-fit and/or force-fit connection between the tool according to the invention and the tooth fragment, in particular the tooth root or the tooth root remnant, in that the tool according to the invention is tilted, wedged, clamped or hooked into the tooth fragment, in particular the tooth root or the tooth root fragment. This happens essentially in that the retentive section is introduced into the tooth root canal or the bore produced by the drilling section. In order to make this possible, it is practical to dispose the retentive section behind the drilling section, in the functional direction, and consequently between the base and the drilling section.

It can be advantageous if at least one intermediate element is disposed between the retentive section and the base and/or between the retentive section and the drilling section.

The intermediate element can be configured as an independent individual part, which can be connected, in particular, with the base and the retentive section. The intermediate element can be configured in one piece with the retentive section and/or the base. In particular, a functionally neutral, preferably short intermediate element can be provided between the retentive section and the drilling section.

It can be practical if the drilling section has a length that is less than the length of the retentive section. Possibly advantageous embodiments provide for a length of 12 to 18 mm, preferably 15 mm, for the base, 10 to 15 mm, preferably 13 mm, for the intermediate element, 5 to 12 mm, preferably 10 mm, for the retentive section, and/or 1 to 3 mm, preferably 1 to 2 mm, for the drilling section. In this regard, it is advantageous if the total length of the tool according to the invention does not exceed the length of 38 mm.

It can be advantageous if the retentive section has at least one retentive element, wherein the retentive element is configured, in particular, as a barb or as a type of Archimedean screw or in the manner of a corkscrew.

In order to produce a shape-fit and/or force-fit connection between the retentive section and the tooth fragment, in particular the tooth root or the tooth root remnant, the retentive section has retentive elements that tilt, wedge, clamp or hook into the tooth root canal or into a bore when the retentive section is introduced into it.

It can be advantageous if the retentive element is formed in the retentive section by means of a recess or slit, in particular a narrowing recess or slit.

A simple possibility for producing retentive elements within the retentive section consists in producing a recess or slit in the base of the retentive section by means of a chip-cutting method.

It is advantageous if the recesses or slits narrow with an increasing depth of the recess or slit in the base of the retentive section.

It can be advantageous if the recess or slit encloses an angle not equal to 90° with the surface of the base of the retentive section.

In order to produce a structure similar to that of a barb by means of a recess or slit, it is advantageous to introduce the recess into the base of the retentive section at an angle not equal to 90°.

It can be advantageous if the recesses or slits narrow in the direction of the drilling section.

It can be advantageous if at least two of the existing recesses or slits each enclose a different angle with the surface of the base of the retentive section.

It can be advantageous if the drilling section, preferably with the exception of the drilling head as such or of the drilling tip as such and the retentive section overlap, at least in part. In this way, the result is achieved that the functions of the drilling section and of the retentive section are provided in a common section, at least in part. As a result, more space is available for configuration of the functions. In particular, in this way the length of the needle can be configured to be relatively short, and this can be practical for some applications.

It can be advantageous if the drilling section and/or the retentive section are configured in the manner of a spiral, at least in part. It is advantageous that in this manner, the drilling section with its tip and the retentive section can be configured in one piece.

For certain purposes of use, it can be advantageous if the drilling section and/or the retentive section have a circular basic shape in cross-section. For some purposes of use, it can be advantageous if the drilling section and/or the retentive section have a triangular basic shape in cross-section. For other purposes of use, it can be advantageous if the drilling section and/or the retentive section have a square basic shape in cross-section. It can be advantageous if preferably every retentive element is formed in the basic shape of the retentive section by means of a recess or slit, in such a manner that barbs form in the retentive section, which barbs preferably project out beyond the basic shape. The recesses or slits are preferably formed by means of a chip-cutting method, wherein the chip is not complete severed, but rather has a free end on the one side and is still connected in one piece with the basic shape on the other side. The chip, which projects out of the basic shape, then forms the barb. Preferably, the recess or slit is introduced in the corner regions in the case of a polygonal basic shape, and thereby the chip, which projects out of the basic shape and forms the barb, is given a pointed tip.

It can be advantageous if the incision is made at an angle of less than 90°, preferably of maximally 80°, particularly preferably of maximally 60°, very particularly preferably of maximally 45°, even more preferably of maximally 25°. It can be advantageous if the incision is made at an angle of at least 5°, preferably of at least 7°, particularly preferably of at least 10°, very particularly preferably of at least 15°.

It can be advantageous if preferably every retentive element is formed in the basic shape of the retentive section by means of a recess or slit, in such a manner that barbs form in the retentive section, which preferably project beyond the basic shape, wherein the barbs are preferably configured in such a manner that the tool, in particular the needle, in particular the retentive section, can only be used once.

It can be advantageous if the retentive section or at least one retentive element consists of a shape memory alloy, in particular Nitinol.

Shape memory alloys or Memory Metals or shape memory metals are special metals that can exist in the form of two different crystal structures. These metals are known for the ability that they can be bent out of a defined basic shape and "automatically" return to the defined basic shape under defined transformation conditions, such as temperature or mechanical stress, for example.

In particular with the transformation condition of temperature, it is possible to predetermine any desired temperature for shape memory alloys, in particular Nitinol, starting from which the Nitinol returns to its basic shape. Thus, it can be advantageous if the sections and/or elements that comprise a shape memory alloy, in particular Nitinol, return to a basic shape at a temperature that lies in a temperature range between 30° C. and 40° C., preferably 35° C. and 38° C., particularly preferably between 36.3° C. and 37.4° C., very particularly preferably at the normal body temperature of a human being.

The method of functioning is fundamentally based on the fact that a basic shape is "pre-programmed" into a workpiece at high temperatures. After the basic shape has been pre-programmed, the material can be deformed at room temperature as desired, to the greatest possible extent. By applying defined transformation conditions, the crystal structure of the workpiece re-organizes, and the workpiece is automatically brought back into its pre-programmed basic shape.

A shape memory alloy that is known and can be used for medical technology is Nitinol, a nickel-titanium alloy.

For use in the tool according to the invention, this means that parts, in particular, or the entire retentive section is/are produced from a shape memory alloy, in particular Nitinol. In this regard, the pre-programmed basic shape of the shape memory alloy corresponds to an end position of the retentive elements of the retentive section, in which the tooth fragment, in particular the tooth root or the tooth root remnant, is supposed to be removed from the alveolus. In the case that the retentive elements are configured as barbs, this means, for example, that the basic shape of the shape memory alloy describes the barbs in a position angled away or spread away from the longitudinal axis of the needle. Before use of the tool according to the invention in accordance with its intended use, the barbs of the retentive section are brought into a starting position, in that the barbs are deformed in such a manner that they lie flat against the retentive section, at least to the greatest possible extent. Consequently, the effective diameter of the retentive section is reduced before the tool according to the invention is introduced into the tooth root canal or the bore in the tooth fragment. This allows easier and pain-free introduction of the tool according to the invention, in particular of the retentive section, into the tooth root canal or the bore in the tooth fragment.

After introduction of the retentive section into the tooth root canal or the bore of the tooth fragment, the defined transformation conditions are applied, which lead to the result that the retentive section, in particular the retentive elements, automatically return to their end position, i.e. to the basic shape of the shape memory alloy. This means, when the retentive elements are configured as barbs, that these angle away or spread away from the retentive section, starting from a starting position in which the barbs lie flat against the retentive section to the greatest possible extent, and thereby a shape-fit and/or force-fit connection, in particular tilting, wedging, clamping or hooking of the retentive elements into the wall of the bore in the tooth fragment or the wall of the tooth root canal is brought about. This bringing of the retentive elements into their end position or into the basic shape of the shape memory alloy brings about a shape-fit and/or force-fit connection between the tool according to the invention, in particular the retentive section, and the tooth fragment, in particular the tooth root or the tooth root remnant.

Furthermore, the invention comprises a method for extraction of tooth fragments, in particular tooth roots and/or tooth root remnants, from a tooth socket or an alveolus in the jaw region, by means of a medical tool according to the invention, comprising the method steps:
  introduction of a drilling section into the tooth fragment,
  at least partial introduction of a retentive section into the tooth fragment,
  application of a defined transformation condition,
  waiting until the tool, in particular the retentive section, has completed a transformation from a starting position into an end position, removal of the tool, along with the tooth fragment, from the alveolus.

Before the actual extraction of a tooth fragment, in particular a tooth root or a tooth root remnant, the individual parts, in the case that the medical tool is composed of multiple individual parts, are combined to form a medical tool according to the invention and connected with one another. Subsequently, the retentive section, if it is not already supplied in the starting position, is brought into the starting position. In this starting position, the retentive elements are disposed on the retentive section in such a manner that the effective diameter of the retentive section is not enlarged, and the retentive section particularly has a diameter that is equal to or smaller than the diameter of the drilling section.

After the tool according to the invention has been brought into the starting position, the tool according to the invention is set onto the tooth fragment and put into rotation by means of a drive. In this regard, the drive can take place by means of an electrically or pneumatically driven drive or by means of a manual or hand-operated drive. The drilling section penetrates into the tooth fragment due to the rotation.

As soon as the drilling section has penetrated completely into the tooth fragment, the retentive section of the tool also penetrates into the tooth fragment, at least in part. When the retentive section has been introduced entirely or far enough into the tooth fragment, defined transformation conditions are applied to the medical tool, in particular to the retentive section, which lead to the result that the medical tool, in particular the retentive section, performs a transformation from the starting position into an end position, or into a basic shape of the shape memory alloy.

As soon as the transformation of the medical tool, in particular of the retentive section, has been completed, the medical tool is connected with the tooth fragment with shape fit and/or force fit, and the medical tool, together with the tooth fragment, can be removed from the alveolus.

It can be advantageous if the tool, in particular the retentive section, is brought into a starting position before introduction of the drilling section into the tooth fragment.

It can be advantageous if a tooth root canal is cleaned or a bore is introduced into the tooth fragment at the same time with introduction of the drilling section into the tooth fragment, in particular into the tooth root or the tooth root remnant.

Further developments and advantageous embodiments of the invention can also become evident from the following description of an exemplary embodiment, which is shown in the drawing. The drawing shows:

FIG. 1 a schematic view of a first embodiment of a medical tool according to the invention, FIG. 2 a schematic view of a second embodiment of a medical tool according to the invention, FIG. 3 a view of a second embodiment of a medical tool according to the invention, with an enlarged detail region, FIG. 4 a schematic view of the first embodiment of a medical tool according to the invention, in a first variant, structured in multiple parts, in the non-assembled state, FIG. 5 a schematic view of the first embodiment of a medical tool according to the invention, in a second variant, structured in multiple parts, in the non-assembled state, FIG. 6 a schematic view of the first embodiment of a medical tool according to the invention, with an advantageous dimensioning of the individual sections, FIG. 7 a view of the second embodiment of a medical tool according to the invention, with an advantageous dimensioning of the individual sections, FIG. 8 a schematic view of a third embodiment of a medical tool according to the invention, with an enlarged detail region, FIG. 9 a partial view of the drilling section and the retentive section of a further embodiment of the medical tool according to the invention, and FIG. 10 a partial view of the drilling section and the retentive section of a further embodiment of the medical tool according to the invention.

FIG. 1 shows a schematic drawing of a first embodiment of a medical tool 10 according to the invention, comprising a base 12 and a needle 14. A first end of the needle 14 is disposed on the base 12 and connected with the base 12. At the end of the needle 14 that is not connected with the base 12, a drilling section 16 is disposed. The drilling section 16 narrows to a point toward the free end of the needle 14, and has at least one groove on its surface, wherein the groove winds around the drilling section 16 in spiral shape.

A retentive section 18 is disposed following the drilling section 16 and lying between the drilling section 16 and the base 12. The retentive section 18 has a diameter, in its base element 20, which corresponds to the diameter of the drilling section 16, at least to the greatest possible extent. Retentive elements 22 in the form of barbs are disposed on the base element 20 of the retentive section 18. The retentive elements 22 are connected with the base 20 of the retentive section 18 with material fit. In this regard, the free ends of the retentive elements 22 face in the direction of the drilling section 16.

Furthermore, in FIG. 1 the retentive section 18 is shown in an end position or a basic shape of the shape memory alloy. In this end position or a basic shape of the shape memory alloy, the retentive elements 20 are in a state in which they are angled away or spread away from the base element 20. Consequently, the retentive section 18 has a diameter, in this end position or a basic shape of the shape memory alloy, which is greater than the diameter of the drilling section 16.

In the embodiment shown, an intermediate element 24 is disposed between the retentive section 18 and the base 12.

FIG. 2 shows a schematic view of a second embodiment of a medical tool 10 according to the invention. The second embodiment differs from the first embodiment in that the free ends of the retentive elements 22 face in the direction of the base 12. The remaining explanations with regard to the first embodiment according to FIG. 1 can be transferred analogously to the second embodiment.

FIG. 3 shows a view of a second embodiment of a medical tool 10 according to the invention, wherein a region of the retentive section 18 is shown in an enlarged detail region. In the detail region, the configuration of the retentive elements 22 as barbs is clearly evident. In this regard, the retentive elements 22 are disposed at the end of a depression that is oval, at least to the greatest possible extent, which end faces the drilling section 16. Correspondingly, the free end of the retentive elements 22 faces in the direction of the base 12. Furthermore, the retentive element 22 is configured to be wider at its end that is connected with the depression than at the free end, and narrows to a point toward the free end.

For the remainder, the explanations with regard to the second embodiment according to FIG. 2 can be transferred analogously.

FIG. 4 shows a schematic view of the first embodiment of a medical tool 10 according to the invention, in a first variant, structured in multiple parts, in the non-assembled state. In the representation shown, the medical tool 10 according to the invention is shown in three individual parts, which can be connected with one another.

Figure 1:
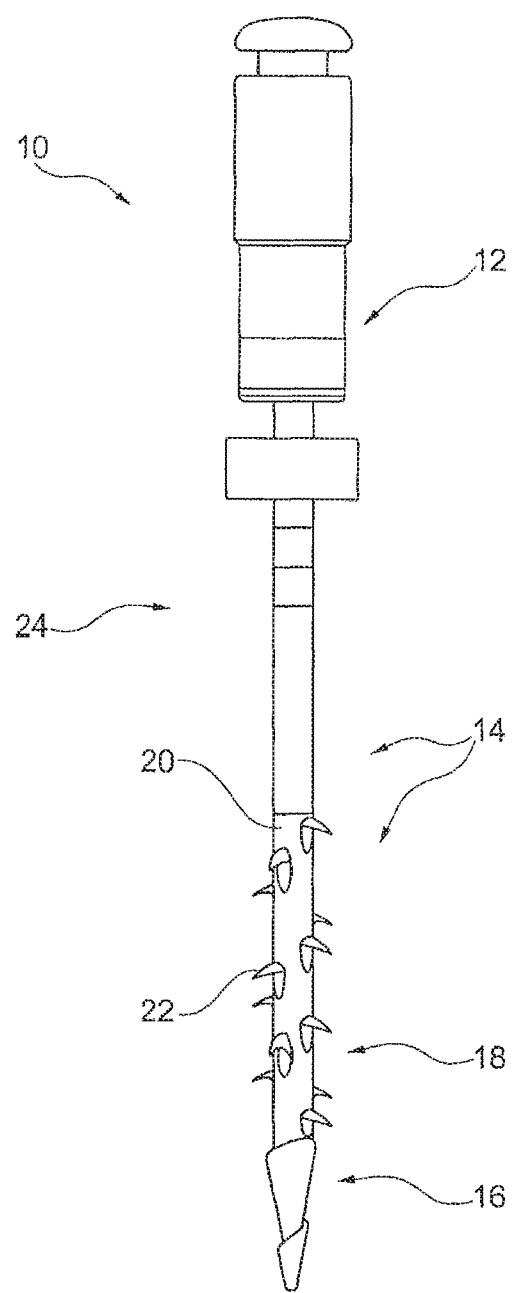

In the variant shown, the intermediate element 24 is firmly connected with the base 12 of the tool 10 according to the invention. The retentive section 18 and the drilling section 16 are each configured in one piece, and can be connected with one another. In this regard, the retentive section 18 can be connected with the intermediate element 24 in such a manner that the free ends of the retentive elements face in the direction of the drilling section 16. The drilling section 16 can be connected with the retentive section 18 in such a manner that the end of the drilling section 16 that runs to a narrow point faces away from the base 12.

With regard to the further structure of the tool 10 according to the invention, reference is made to the explanations regarding FIG. 1.

Figure 5:
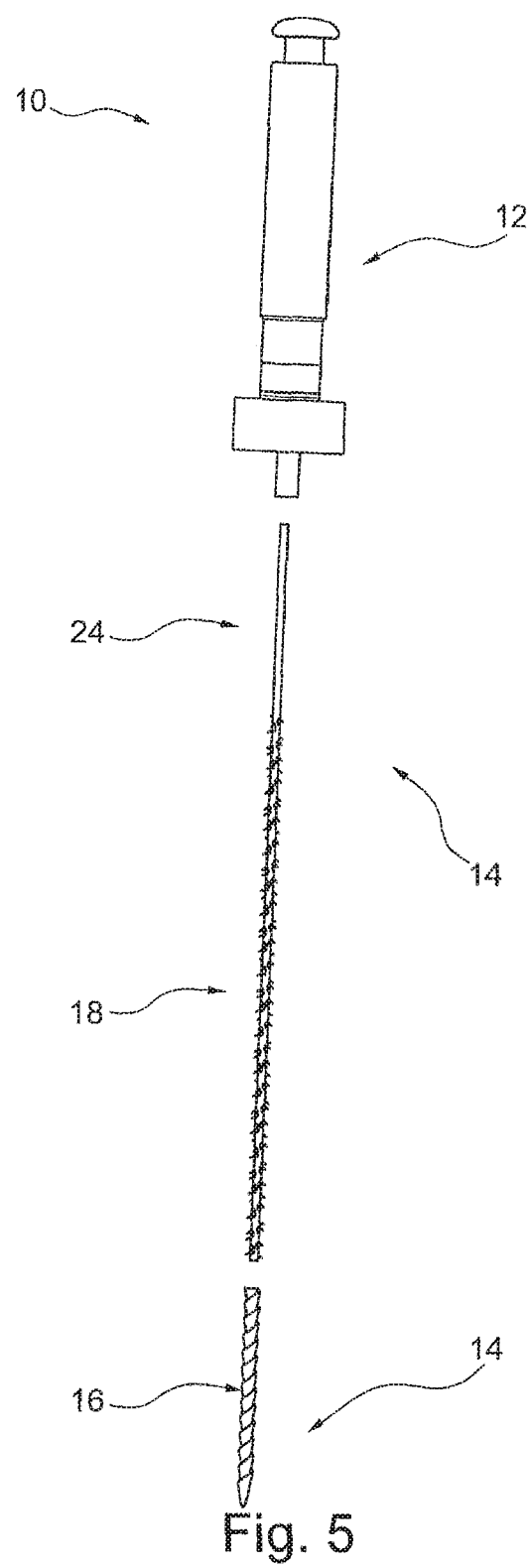

FIG. 5 shows a schematic view of the first embodiment of a medical tool 10 according to the invention, in a second variant, structured in multiple parts, in the non-assembled state. In the representation shown, the medical tool 10 according to the invention is shown in three individual parts, which can be connected with one another.

The tool 10 according to the invention comprises a base 12 and a needle 14, wherein the needle 14, in this exemplary embodiment, consists of a drilling section 16, a retentive section 18, and an intermediate element 24. Furthermore, the retentive section 18 and the intermediate element 24 are configured in one piece.

The intermediate element 24 can be connected with the base 12, and the drilling section 16 can be connected with the retentive section 18.

The drilling section 16 narrows to a point toward the free end of the needle 14, and has at least one groove on its surface, wherein the groove winds around the drilling section 16 in spiral shape.

With regard to the further structure of the tool 10 according to the invention, reference is made to the explanations regarding FIG. 1.

Figure 6:
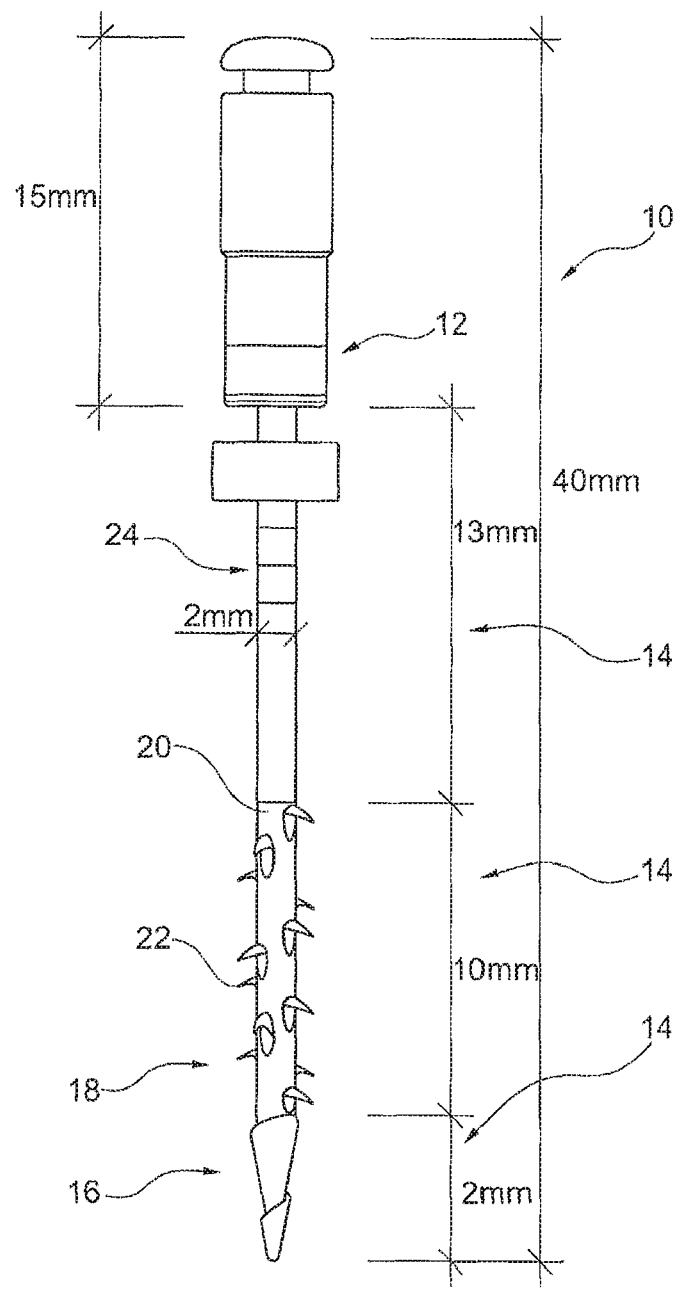

FIG. 6 shows a schematic view of the first embodiment of a medical tool 10 according to the invention, with an advantageous dimensioning of the individual sections.

The tool according to the invention has a total length, from the free end of the base 12 to the free end of the drilling section 16, of 40 mm. In the embodiment shown, the total length results from a base 12 having a length of 15 mm, an intermediate element 24 having a length of 13 mm, a retentive section 18 having a length of 10 mm, and a drilling section 16 having a length of 2 mm. The diameter of the drilling section 16 amounts to 2 mm at its widest point and narrows toward the free end of the drilling section 16. The base element 2 also has a diameter of 2 mm. On the basis of the retentive elements 22, which are spread away in the basic shape, the retentive section 18 has a diameter greater than 2 mm in the basic shape.

Figure 4:
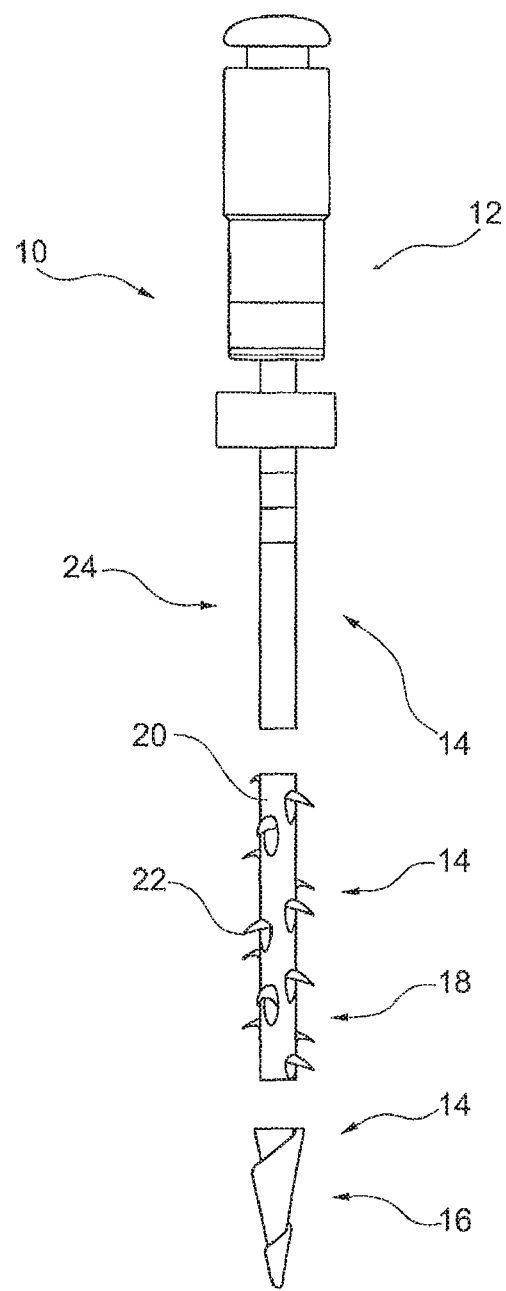
FIGS. 4 and 5 show two possible embodiments for a multi-part structure of the medical tool 10 according to the invention on the basis of the first exemplary embodiment, and can also be applied analogously to the second embodiment.

The said dimensioning represents the expanse of the individual sections for an embodiment configured in one piece or an embodiment configured in multiple parts, in the assembled state. In the case of a multi-part structure of the tool 10 according to the invention, as shown in FIGS. 4 and 5, the individual parts can be configured to be longer, for example due to connection regions that are present.

With regard to the further structure of the tool 10 according to the invention, reference is made to the explanations regarding FIG. 1.

Figure 7:
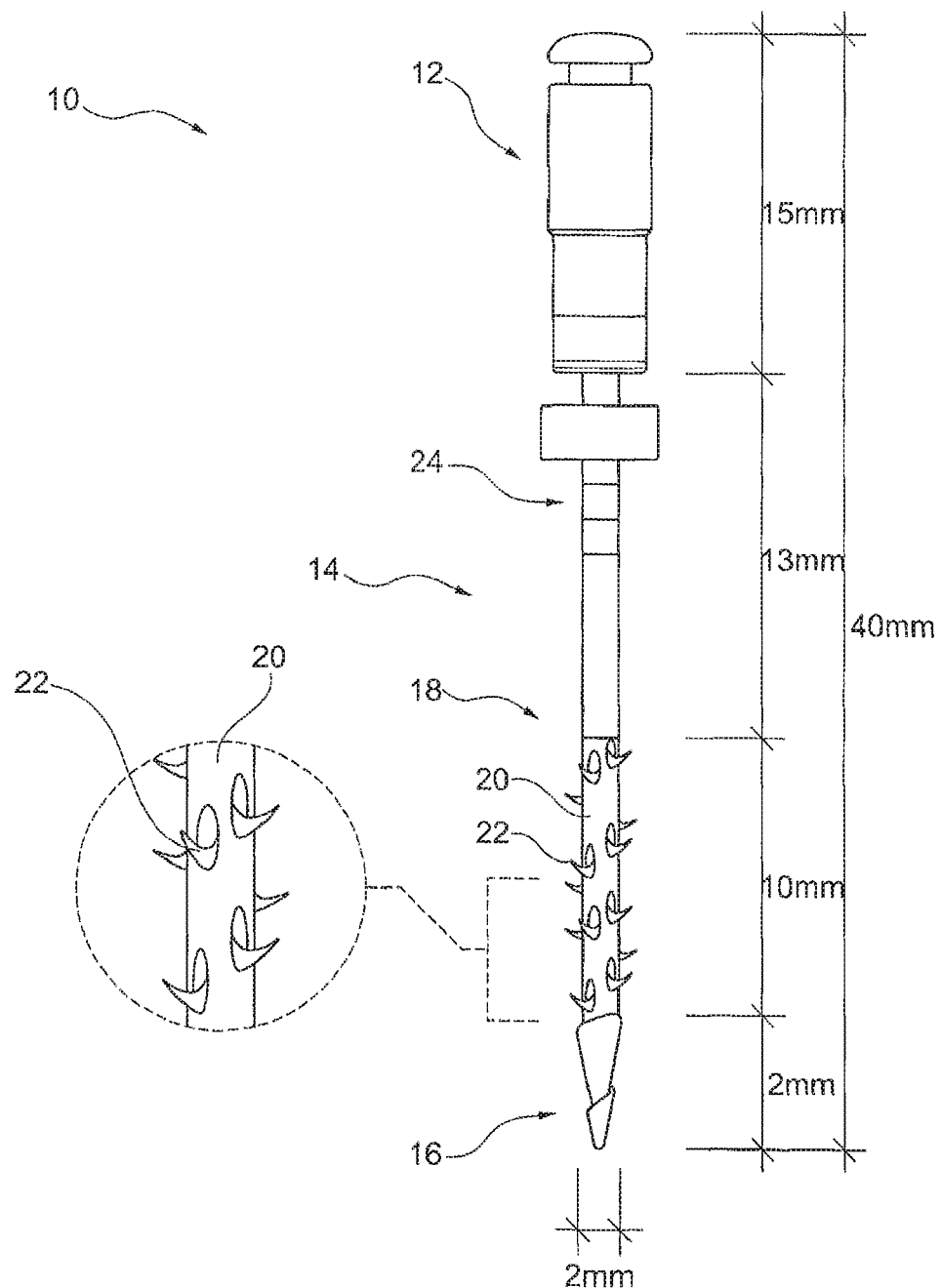

FIG. 7 shows a view of the second embodiment of a medical tool 10 according to the invention, with an advantageous dimensioning of the individual sections.

The tool according to the invention has a total length, from the free end of the base 12 to the free end of the drilling section 16, of 40 mm. In the embodiment shown, the total length results from a base 12 having a length of 15 mm, an intermediate element 24 having a length of 13 mm, a retentive section 18 having a length of 10 mm, and a drilling section 16 having a length of 2 mm. The diameter of the drilling section 16 amounts to 2 mm at its widest point and narrows toward the free end of the drilling section 16. The base element 20 also has a diameter of 2 mm. On the basis of the retentive elements 22, which are spread away in the basic shape, the retentive section 18 has a diameter greater than 2 mm in the basic shape.

The said dimensioning represents the expanse of the individual sections for an embodiment configured in one piece or an embodiment configured in multiple parts, in the assembled state. In the case of a multi-part structure of the tool 10 according to the invention, as shown in FIGS. 4 and 5, the individual parts can be configured to be longer, for example due to connection regions that are present.

Figure 2:
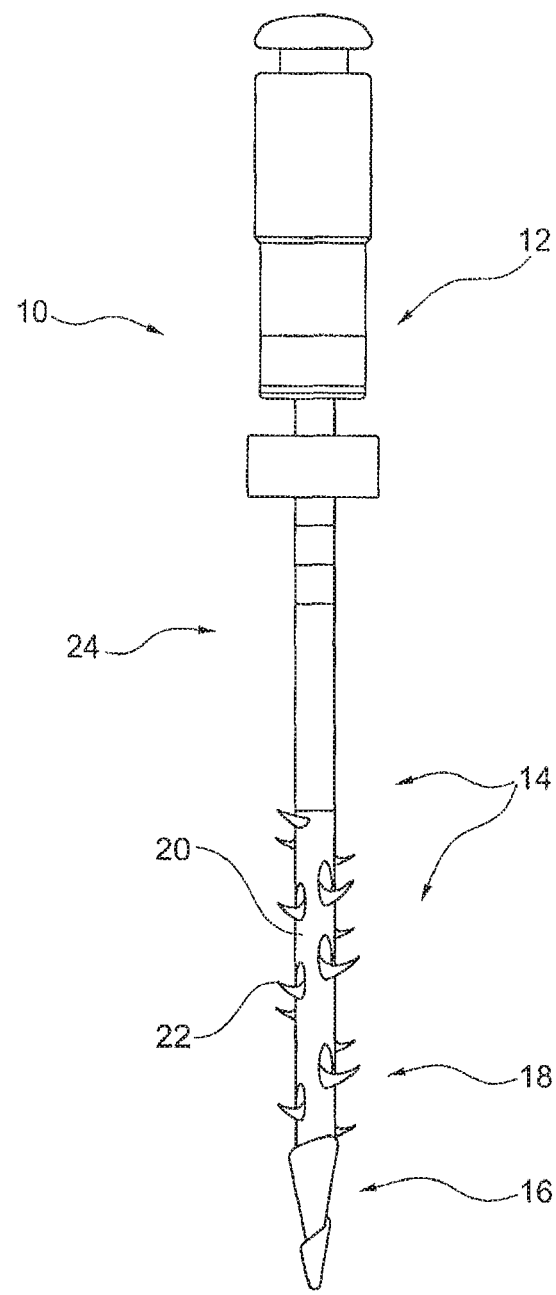
Figure 3:
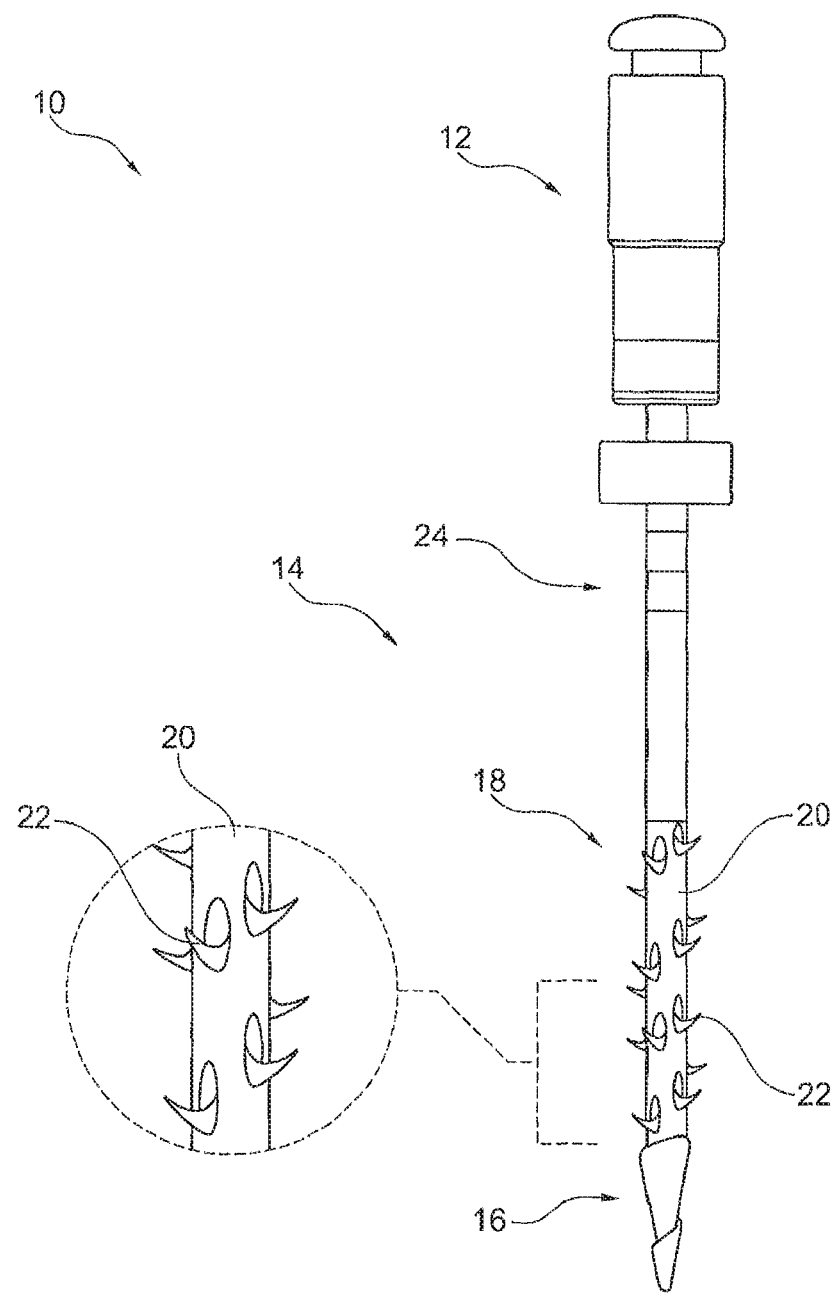

With regard to the further structure of the tool 10 according to the invention, reference is made to the explanations regarding FIGS. 2 and 3.

Figure 8:
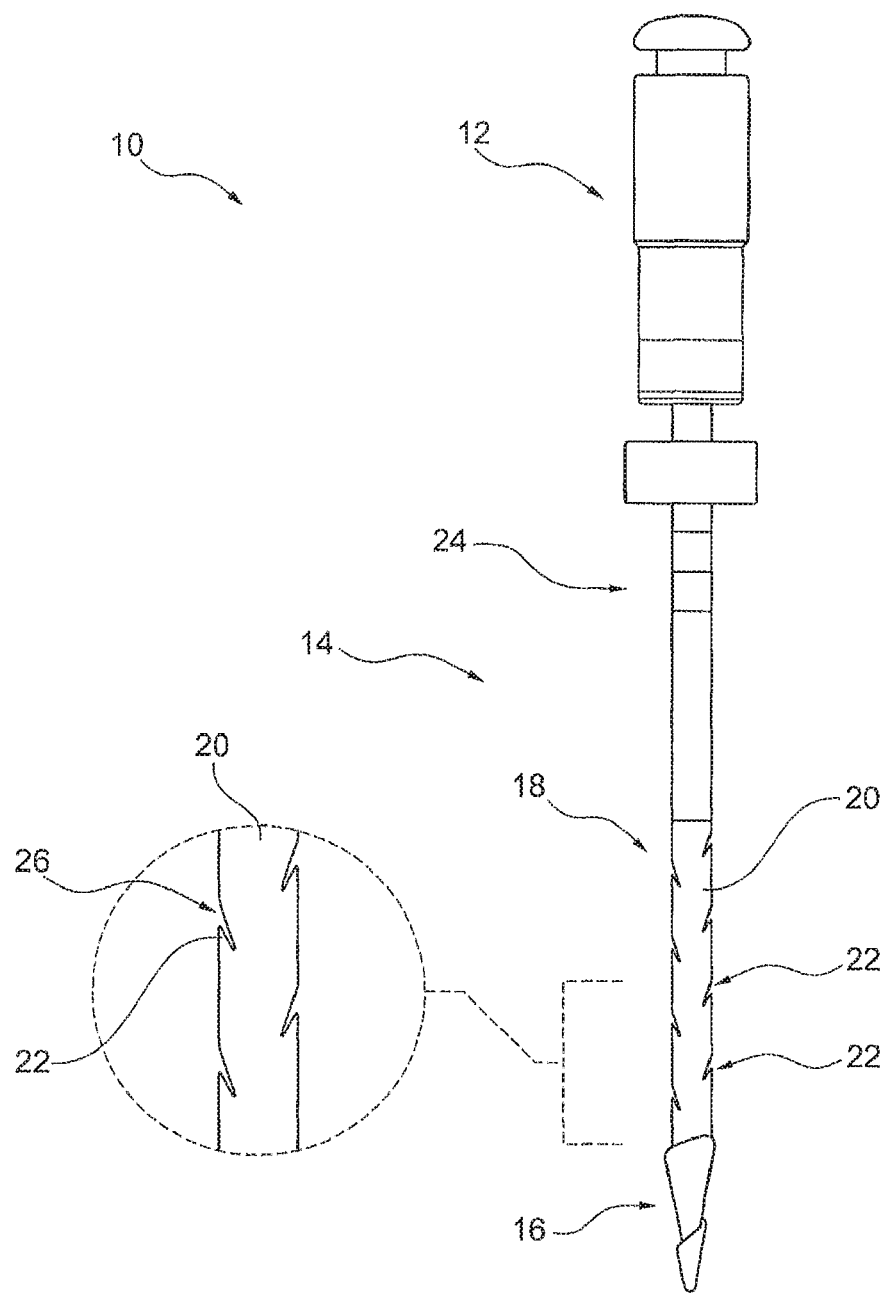

FIG. 8 shows a schematic drawing of a third embodiment of a medical tool 10 according to the invention, comprising a base 12 and a needle 14. A first end of the needle 14 is disposed on the base 12 and connected with the base 12. At the end of the needle 14 that is not connected with the base 12, a drilling section 16 is disposed. The drilling section 16 narrows to a point toward the free end of the needle 14, and has at least one groove on its surface, wherein the groove winds around the drilling section 16 in spiral shape.

A retentive section 18 is disposed following the drilling section 16 and lying between the drilling section 16 and the base 12. The retentive section 18 has a diameter, in its base element 20, which corresponds to the diameter of the drilling section 16, at least to the greatest possible extent. Retentive elements 22 in the form of barbs are disposed on the base element 20 of the retentive section 18. The retentive elements 22 are connected with the base 20 of the retentive section 18 with material fit. In this regard, the free ends of the retentive elements 22 face in the direction of the drilling section 16.

The retentive elements 22, which are configured as barbs, are produced by means of recesses 26 or slits in the base 20 of the retentive section 18. As is clearly evident in the detail region, the recesses 26 or slits have an angle not equal to 90° with the surface of the base 20 of the retentive section 18.

It is advantageous if the recesses 26 or slits narrow with an increasing depth of the recess 26 or slit in the base 20 of the retentive section 18. It is advantageous if the recesses 26 or slits narrow in the direction of the drilling section 16.

Furthermore, in FIG. 8 the retentive section 18 is shown in a starting position. In this starting position, the retentive elements 20 are in a state in which they are not angled away or spread away from the base element 20. Consequently, the retentive section 18 has a diameter, in this starting position, which corresponds to the diameter of the drilling section 16, to the greatest possible extent, in particular is smaller than the diameter of the drilling section 16.

In the embodiment shown, an intermediate element 24 is disposed between the retentive section 18 and the base 12.

Figure 9:
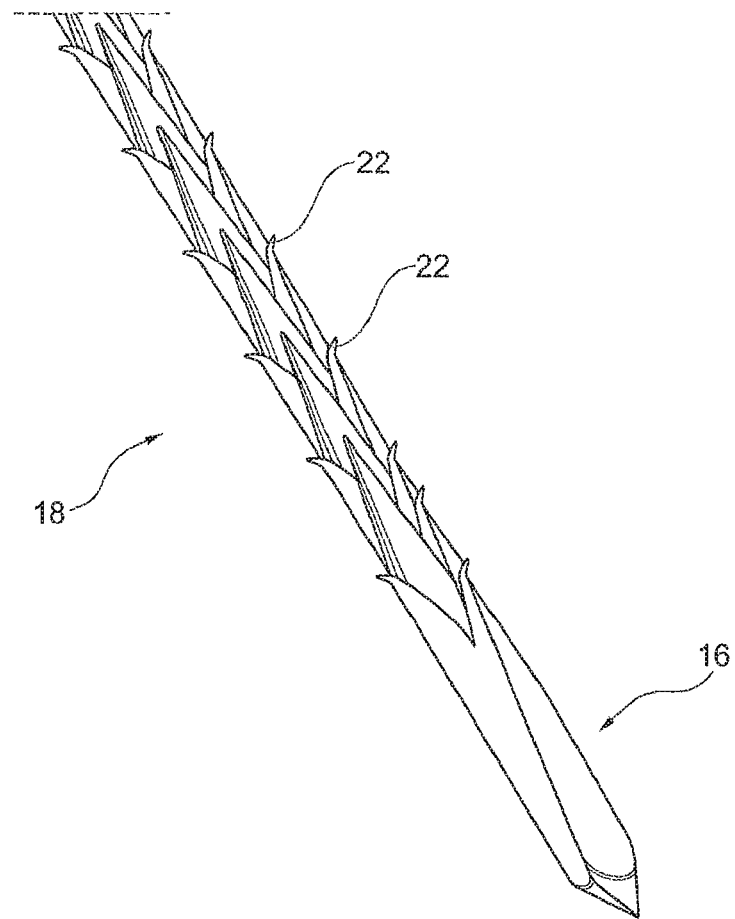
Figure 10:
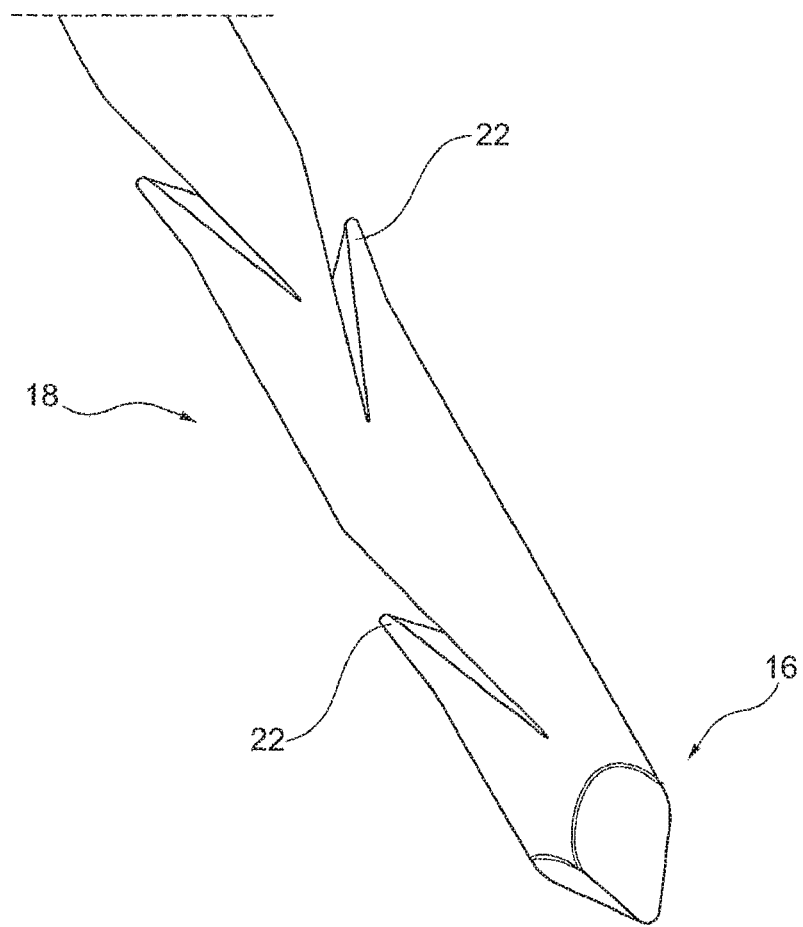

FIGS. 9 and 10 each show a partial view of the drilling section 16 and the retentive section 18 of further embodiments of the medical tool according to the invention. According to FIG. 9, the drilling section 16 and the retentive section 18 have a square basic shape in cross-section. According to FIG. 10, the drilling section 16 and the retentive section 18 have a circular basic shape in cross-section. Each retentive element 22 is formed by means of a slit introduced into the basic shape of the retentive section, in such a manner that barbs form in the retentive section, which barbs project beyond the basic shape. The slits are formed by means of a chip-cutting method, wherein the chip is not completely severed, but rather has a free end on one side and is still connected in one piece with the basic shape on the other side. The chip, which projects out of the basic shape, then forms the barb 22.

In the basic shape shown in FIG. 9, which is square in cross-section, the slit is introduced into the corner regions, and thereby the chip that projects out of the basic shape and forms the barb is given a point. According to FIG. 9, drilling section 16 and retentive section 18 are configured in the manner of a spiral, at least in part, and in one piece.

REFERENCE SYMBOL LIST (Is Part of the Description)
10 tool
12 base
14 needle
16 drilling section
18 retentive section
20 base element
22 retentive element
24 intermediate element
26 recess/slit

The invention claimed is:

1. A medical tool configured for removal of tooth fragments from a tooth socket or an alveolus in the jaw region, comprising a base and a needle disposed on the base, wherein the needle has a retentive section with a first diameter and a drilling section with a portion having a second diameter greater than or equal to the first diameter, wherein the retentive section has at least one retentive element of a barb configured to be extendable beyond the first diameter to connect the medical tool to the tooth fragment as a wedge, clamp, or hook, wherein the drilling section is disposed on the end of the needle that lies opposite to the base, and wherein the retentive section is disposed between the base and the drilling section.

2. The medical tool according to claim 1, wherein the base and the needle and/or the needle as such are configured in one piece.

3. The medical tool according to claim 1, wherein the base and the needle are configured in multiple parts and can be connected with one another.

4. The medical tool according to claim 1, wherein the needle is configured in multiple parts and the retentive section and the drilling section each form an individual element, and wherein the individual elements of the needle can be connected with one another.

5. The medical tool according to claim 1, wherein the retentive section and the drilling section are configured in one piece.

6. The medical tool according to claim 1, wherein the drilling section has a narrowing tip.

7. The medical tool according to claim 1, wherein at least one intermediate element is disposed between the retentive section and the base and/or between the retentive section and the drilling section.

8. The medical tool according to claim 1, wherein the retentive element is formed in the retentive section via a recess or slit.

9. The medical tool according to claim 1, wherein the retentive section or the at least one retentive element comprises a shape memory alloy.

10. The medical tool according to claim 1, wherein the drilling section has a length that is less than the length of the retentive section.

11. The medical tool according to claim 1, wherein the drilling section and/or the retentive section are configured in spiral shape, at least in part.

12. A method for extraction of tooth fragments from a tooth socket or an alveolus in the jaw region, via the medical tool according to claim 1, comprising the method steps:
   introduction of the drilling section into the tooth fragment,
   at least partial introduction of the retentive section into the tooth fragment,
   application of a defined transformation condition,
   waiting until the tool has completed a transformation from a starting position into an end position, and
   removal of the tool, along with the tooth fragment, from the alveolus.

13. The method according to claim 12, wherein the tool is brought into a starting position before introduction of the drilling section into the tooth fragment.

14. The method according to claim 12, wherein a tooth root canal is cleaned or a bore is introduced into the tooth fragment at the same time with introduction of the drilling section into the tooth fragment.

* * * * *